(12) United States Patent
Hu et al.

(10) Patent No.: US 11,329,523 B2
(45) Date of Patent: May 10, 2022

(54) PERMANENT MAGNET BRUSH MICROMOTOR AND ASSEMBLY METHOD THEREOF

(71) Applicant: Jiankun Hu, Guangdong (CN)

(72) Inventors: Jiankun Hu, Guangdong (CN); Yongkui Huang, Guangdong (CN)

(73) Assignee: Jiankun Hu, Shenzhen (CN)

( * ) Notice: Subject to any disclaimer, the term of this patent is extended or adjusted under 35 U.S.C. 154(b) by 64 days.

(21) Appl. No.: 17/052,525

(22) PCT Filed: May 6, 2019

(86) PCT No.: PCT/CN2019/085597
§ 371 (c)(1),
(2) Date: Nov. 2, 2020

(87) PCT Pub. No.: WO2019/214558
PCT Pub. Date: Nov. 14, 2019

(65) Prior Publication Data
US 2021/0242730 A1 Aug. 5, 2021

(30) Foreign Application Priority Data

May 10, 2018 (CN) .......................... 201810444342.0

(51) Int. Cl.
*H02K 1/17* (2006.01)
*H02K 5/14* (2006.01)
(Continued)

(52) U.S. Cl.
CPC .............. *H02K 1/17* (2013.01); *H02K 1/187* (2013.01); *H02K 5/145* (2013.01); *H02K 5/1737* (2013.01);
(Continued)

(58) Field of Classification Search
CPC ........... H02K 1/17; H02K 1/187; H02K 1/18; H02K 23/04; H02K 13/006; H02K 13/10; H02K 15/03; H02K 15/12
(Continued)

(56) References Cited

U.S. PATENT DOCUMENTS 3,156,838 A * 11/1964 Winther ................. H02K 23/40
310/40 MM
4,335,323 A * 6/1982 Kebbon ................... H02K 5/04
310/90

FOREIGN PATENT DOCUMENTS

CN 201623561 U 11/2010
CN 102324805 A 1/2012
(Continued)

OTHER PUBLICATIONS

Machine translation of JP-04140048-A. (Year: 1992).*
(Continued)

*Primary Examiner* — Michael Andrews (57) ABSTRACT

Provided is a permanent magnet brush micromotor and an assembly method thereof. Its upper stator bracket and lower stator bracket are designed to fit together, and the concave parts of the upper stator bracket and lower stator bracket are matched to form a complete mounting cavity for mounting a motor shaft, core winding, bearings and commutator. The core winding, bearings and commutator are installed on the motor shaft to form a mover assembly, and then the mover assembly is installed in the concave part of the lower stator bracket. Finally, combining and fixing the upper stator bracket and lower stator bracket with electric brushes which are respectively placed in brush mounting positions. And, two bearings are fixed or pressed on the same component, so that the concentricity and coaxiality of the bearings can be ensured, the compression of the central biasing force is avoided during assembly.

9 Claims, 5 Drawing Sheets

(51) Int. Cl.
*H02K 15/03* (2006.01)
*H02K 1/18* (2006.01)
*H02K 5/173* (2006.01)
*H02K 13/00* (2006.01)
*H02K 13/10* (2006.01)
*H02K 15/12* (2006.01)
*H02K 23/04* (2006.01)

(52) U.S. Cl.
CPC ........... *H02K 13/006* (2013.01); *H02K 13/10* (2013.01); *H02K 15/03* (2013.01); *H02K 15/12* (2013.01); *H02K 23/04* (2013.01)

(58) Field of Classification Search
USPC ...... 310/154.11, 154.09, 238, 239, 428, 429, 310/430
See application file for complete search history.

(56) References Cited

FOREIGN PATENT DOCUMENTS

| CN | 107659106 A | 2/2018 | |
|---|---|---|---|
| CN | 208158251 U | 11/2018 | |
| GB | 1314999 A | 4/1973 | |
| JP | 04140048 A * | 5/1992 | ............. H02K 23/04 |
| JP | H04140048 A | 5/1992 | |

OTHER PUBLICATIONS

Search report of counterpart European Patent Application No. 19800077.0 dated May 4, 2021.
International Search Report of PCT Patent Application No. PCT/CN2019/085597 dated Aug. 7, 2019.

* cited by examiner

PERMANENT MAGNET BRUSH MICROMOTOR AND ASSEMBLY METHOD THEREOF

TECHNICAL FIELD

The application relates to a motor structure, in particular to a permanent magnet brush micromotor structure.

BACKGROUND

The usual permanent magnet brush micromotor is generally composed of a magnetic metal casing, a rotor and a rear end cover. Bearings and permanent magnets are embedded in the casing, and the section of the casing is a round or a flat round composed of concentric arcs and parallel symmetric lines; the rotor consists of shaft, iron core, winding set and commutator, and the rear end cover is embedded with bearing and two electric brushes. The electric brush is generally an elastic electric brush or an elastic conductive sheet embedded with graphite block, which is fixed on a conductive bracket embedded in the rear end cover.

Bearing embedded in the casing and rear end cover is generally oil-containing and is powder metallurgy, when tightly embedded in the casing, the inner hole will be deformed and contracted. When the rotor shaft of this kind of micromotor is installed in the bearing of the rear end cover, because the distance between two electric brushes is less than the outer diameter of the commutator, the two electric brushes need to be pushed aside first, and then released after installation, and the electric brushes are elastically deformed and pressed on the commutator; then the assembly of the rotor and rear end cover is quickly installed into the casing, and the front end of the rotor shaft is installed into the casing bearing. Finally, the casing and the rear end cover are fixed. The assembly efficiency is affected and the assembly cost is increased by the process that the casing and the rear end cover must fit tightly and be embedded into the bearing, the rear end cover must fit tightly into the electric brush, and the electric brush must be pushed aside during installation.

In addition, because the two bearings are located on the rear end cover and the casing respectively, their concentricity and coaxiality are usually deviated, and the rotation will be blocked after assembly, then the swing motor will be beaten and vibrated, which will deform the bearing hole, causing the rotor shaft to rotate easily due to looseness, and the beating and vibration is not easy to control. With this assembly, the consistency of the motor is difficult to guarantee, the noise is large, and the service life is affected. Moreover, when installing the motor, when the rotor is inserted into the casing, because the rotor core is influenced by the suction force of the permanent magnet, both bearings are pressed by the central biasing force, it is difficult to make the shaft align with the bearing on the casing quickly, which leads to low assembly efficiency and easy damage to the bearing.

SUMMARY

The application provides a novel permanent magnet brush micromotor and an assembly method thereof, which are used for improving the assembly efficiency and structural consistency of the micromotor.

According to one aspect of the application, the application provides a permanent magnet brush micromotor, comprising:

a mover assembly, comprising a motor shaft, and a core winding, a commutator and a bearing installed on the motor shaft, wherein the number of the bearings is two, and the two bearings are respectively arranged on two sides of the core winding;

a stator assembly, comprising an upper stator bracket, a lower stator bracket, and a permanent magnet, a magnetic conductor and an electric brush installed on the upper stator bracket and the lower stator bracket; the upper stator bracket and lower stator bracket are provided with a concave part matched with half of the motor shaft, core winding, bearing and commutator, also provided is a brush mounting position for mounting electric brush; an interface between the upper stator bracket and lower stator bracket is a plane passing through centerline of the motor shaft, the concave parts of the upper stator bracket and lower stator bracket are matched to form a complete mounting cavity for mounting the motor shaft, core winding, bearing and commutator, and the mover assembly is installed in the mounting cavity;

the permanent magnet is installed on the upper stator bracket and lower stator bracket for generating a magnetic field;

the magnetic conductors are respectively installed on the upper stator bracket and lower stator bracket and symmetrically arranged to form a closed magnetic conduction frame for conducting the magnetic field;

the electric brush is mounted at the brush mounting position and contacts with the commutator of the mover assembly.

As a further improvement of the permanent magnet brush micromotor, the upper stator bracket and lower stator bracket are arranged with the electric brush pressing positions respectively, the electric brush pressing position is used for matching with the opposite brush mounting position and pressing the electric brush, the electric brush comprises an upper electric brush and a lower electric brush, the upper electric brush is installed on the brush mounting position of the upper stator bracket, and the lower electric brush is installed on the brush mounting position of the lower stator bracket, the upper electric brush and lower electric brush respectively extend to a placing position of the commutator, so that when the upper stator bracket and lower stator bracket are assembled, the upper electric brush and lower electric brush can respectively abut against outer walls of both sides of the commutator.

As a further improvement of the permanent magnet brush micromotor, the brush mounting position is provided with at least one positioning protrusion, and the upper electric brush and lower electric brush are provided with a positioning hole corresponding to the positioning protrusion, the upper electric brush and lower electric brush are respectively installed on the corresponding positioning protrusion; the electric brush pressing position is provided with a recess corresponding to the positioning protrusion of the brush mounting position.

As a further improvement of the permanent magnet brush micromotor, the number of the positioning protrusion is one, and the positioning protrusion is offset with respect to a width centerline of the corresponding electric brush; or the number of the positioning protrusions is more than two, and the positioning protrusions are asymmetrically arranged relative to the width centerline of the corresponding electric brush.

As a further improvement of the permanent magnet brush micromotor, the brush mounting position is a concave structure, and the brush pressing position is a convex structure, and the convex structure and concave structure are matched and press the corresponding electric brush.

As a further improvement of the permanent magnet brush micromotor, the permanent magnets, electric brushes, brush mounting positions and brush pressing positions are symmetrically distributed around the centerline of the motor shaft.

As a further improvement of the permanent magnet brush micromotor, the upper stator bracket and lower stator bracket are respectively injection molded with injection molding materials.

As a further improvement of the permanent magnet brush micromotor, the number of the permanent magnets is even, half of the permanent magnets are arranged on the upper stator bracket and another half of the permanent magnets are arranged on the lower stator bracket; the magnetic conductor comprises an upper magnetic tile and a lower magnetic tile, the upper magnetic tile covers the outer sides of the upper stator bracket and the corresponding permanent magnet, and the lower magnetic tile covers the outer sides of the lower stator bracket and the corresponding permanent magnet, and the upper magnetic tile and lower magnetic tile are butted to form a closed magnetic conduction frame.

As a further improvement of the permanent magnet brush micromotor, the permanent magnet brush micromotor is a swing motor, an elastic sheet is fixed on the motor shaft, and another end of the elastic sheet is fixed on the upper stator bracket or lower stator bracket.

According to one aspect of the present application, the application provides an assembly method of a permanent magnet brush micromotor as described in any one of the above, comprising:

installing an iron core and a commutator on a motor shaft, then winding a coil wire on the iron core to obtain a core winding, and welding an outgoing line of the core winding on the commutator, two bearings are in sliding fit with the motor shaft to form a mover assembly;

installing a permanent magnet and a magnetic conductor on an upper stator bracket and a lower stator bracket respectively, and then placing electric brushes on brush mounting positions of the upper stator bracket and lower stator bracket respectively, so as to form an upper stator assembly and a lower stator assembly;

installing the mover assembly into a concave part of the lower stator assembly;

combining and fixing the upper stator assembly and lower stator assembly so that the mover assembly is positioned in a complete mounting cavity.

The application has the following beneficial effects:

The application presents a permanent magnet brush micromotor. Its upper stator bracket and lower stator bracket are designed to fit together, and the upper stator bracket and lower stator bracket are provided with concave parts matched with half of the motor shaft, core winding, bearing and commutator, the concave parts of the upper stator bracket and lower stator bracket are matched to form a complete mounting cavity for mounting the motor shaft, core winding, bearing and commutator. With this structure, when assembling the micromotor, firstly the iron core and commutator are installed on the motor shaft, then the coil wire is wound to obtain a winding and the outgoing wire of the winding is welded on the commutator, and then the two bearings are in sliding fit on the motor shaft to form a mover assembly. The permanent magnet and magnetic conductor are installed on the upper stator bracket and lower stator bracket respectively, then the electric brushes are placed in the brush mounting positions of the upper stator bracket and lower stator bracket respectively, then the mover assembly is installed in the concave part of the lower stator bracket, and finally the upper stator bracket and lower stators bracket are combined and fixed. With this structure, the motor is easy for installation, the bearings or electric brushes do not need to be embedded with tight fit, and the electric brushes do not need to be pushed aside during installation, the assembly process can be completed quickly. And, the two bearings are fixed or pressed on the same component, so that the concentricity and coaxiality of the bearings can be ensured, the compression of the central biasing force is avoided during assembly. There is no problem of embedding into the casing, and the assembly is simple.

Further, in some embodiments, the upper stator bracket and lower stator bracket are respectively provided with electric brush pressing positions, the electric brush pressing position is used to match the opposite brush mounting position and press electric brush. The electric brush is installed on the brush mounting position and fixed through the electric brush pressing position. The electric brush extends to the placing position of the commutator, so that when the upper stator bracket and lower stator bracket are assembled, the upper electric brush and lower electric brush can respectively abut against the outer walls on both sides of the commutator, and the electric brush does not need to be pushed aside during installation, thus greatly improving the assembly efficiency.

Furthermore, in some embodiments, the upper stator bracket and lower stator bracket are respectively combined with the casing of the electrical appliance to which the motor is applied, and are integrated with the casing of the electrical appliance, which can reduce the installation steps of the motor in the electrical appliance and improve the assembly efficiency.

DETAILED DESCRIPTION

The present invention will be further explained in detail through specific embodiments and drawings. The application can be implemented in many different ways and is not limited to the implementations described in the embodiments. The following specific embodiments are provided to facilitate a clearer and more thorough understanding of the disclosure of this application, in which the terms indicating orientation, such as upper, lower, left and right, are only for the position of the shown structure in the corresponding drawings.

However, those skilled in the art may realize that the detailed description of one or more of them may not be covered, or other methods, components or materials may also be adopted. In some embodiments, some implementations are not described or described in detail.

In addition, the technical features and technical solutions described herein can also be combined in any appropriate way in one or more embodiments. For those skilled in the art, it will be readily understood that the steps or installation sequences of the methods related to the embodiments provided herein may also be changed. Therefore, any order in the drawings and embodiments is for illustrative purposes only, and does not imply that a certain order is required, unless it is explicitly stated that a certain order is required.

Further, unless otherwise required by context, singular terms shall include pluralities and plural terms shall include the singular. Thus, as used herein and in the claims, the singular forms include the plural reference and vice versa unless the context clearly indicates otherwise.

Embodiment 1

The embodiment provides a permanent magnet brush micromotor.

Referring to FIGS. 1-4, the permanent magnet brush micromotor comprises a mover assembly 100, an upper stator bracket 210, a lower stator bracket 220, a permanent magnet 300, a magnetic conductor 400 and an electric brush 500.

The mover assembly 100 comprises a motor shaft 110, and a core winding 120, a bearing 130, a commutator 140 installed on the motor shaft 110. The core winding 120 includes an iron core and a winding. There are two bearings 130, which are respectively positioned on both sides of the core winding 120, and are installed on the motor shaft 110 in a sliding fit, for supporting the motor shaft 110 and the core winding 120. The commutator 140 is used to keep active connection with the electric brush 500 for transmitting electric energy. The commutator 140 is usually positioned at one end of the motor shaft 110 to facilitate contact with the electric brush 500.

The upper stator bracket 210, lower stator bracket 220, permanent magnet 300, magnetic conductor 400 and electric brush 500 constitute a stator assembly. The upper stator bracket 210 and lower stator bracket 220 are each provided with a concave part (only the concave part 221 of the lower stator bracket 220 is shown in the figure) matching with half of the motor shaft 110, core winding 120, bearing 130 and commutator 140. In other terms, the upper stator bracket 210 and lower stator bracket 220 are respectively provided with the concave parts. The shape of the concave part is matched with half of the motor shaft 110, core winding 120, bearing 130 and commutator 140, and the matching can be completely the same shape, or it can be a structure or shape larger than half of the size of those components, so as to accommodate or fix those components. Finally, the concave parts of the upper stator bracket 210 and lower stator bracket 220 can form a complete mounting cavity for mounting the motor shaft 110, core winding 120, bearing 130 and commutator 140. The motor shaft 110, core winding 120, bearing 130 and commutator 140 are accommodated in the mounting cavity, wherein the bearing 130 is fixed in the mounting cavity. The mover assembly 100 is supported by the bearing 130, and the motor shaft 110, core winding 120 and commutator 140 can rotate under the action of magnetic field.

The upper stator bracket 210 and lower stator bracket 220 are both installed with a permanent magnet 300 for generating a magnetic field for driving the mover assembly 100 to rotate. The magnetic conductors 400 are installed on the upper stator bracket 210 and lower stator bracket 220, together forming a closed magnetic conduction frame for conducting the magnetic field.

The electric brush 500 is fixedly arranged, it can be fixedly installed on the upper stator bracket 210 and the lower stator bracket 220, and is in contact with the commutator 140 to transmit electric energy during the rotation of the commutator 140.

In this embodiment, the brush permanent magnet micromotor is installed as follows: firstly, installing an iron core and commutator 140 on the motor shaft 110, then winding a coil wire on the iron core to obtain the core winding 120, and welding an outgoing line of the core winding 120 on the commutator 140, the two bearings 130 are in sliding fit with the motor shaft 110 to form the mover assembly 100. The upper stator bracket 210 and lower stator bracket 220 can be respectively equipped with permanent magnet 300, magnetic conductor 400 and electric brush 500. Then, installing the mover assembly 100 into the concave part of the lower stator bracket 220, and finally, combining and fixing the upper stator bracket 210 and lower stator bracket 220. With this structure, the motor can be assembled simply and quickly.

The two bearings 130 are fixed or pressed on the same component, so that the concentricity and coaxiality of the bearings can be ensured, the compression of the central biasing force is avoided during assembly. There is no problem of embedding into the casing, and the assembly is simple.

The upper stator bracket 210 and lower stator bracket 220 can be nested through groove and lug boss, or the upper stator bracket 210 and lower stator bracket 220 can be clamped together or fixed together with fasteners, so as to complete the assembly of the motor.

Figure 1:
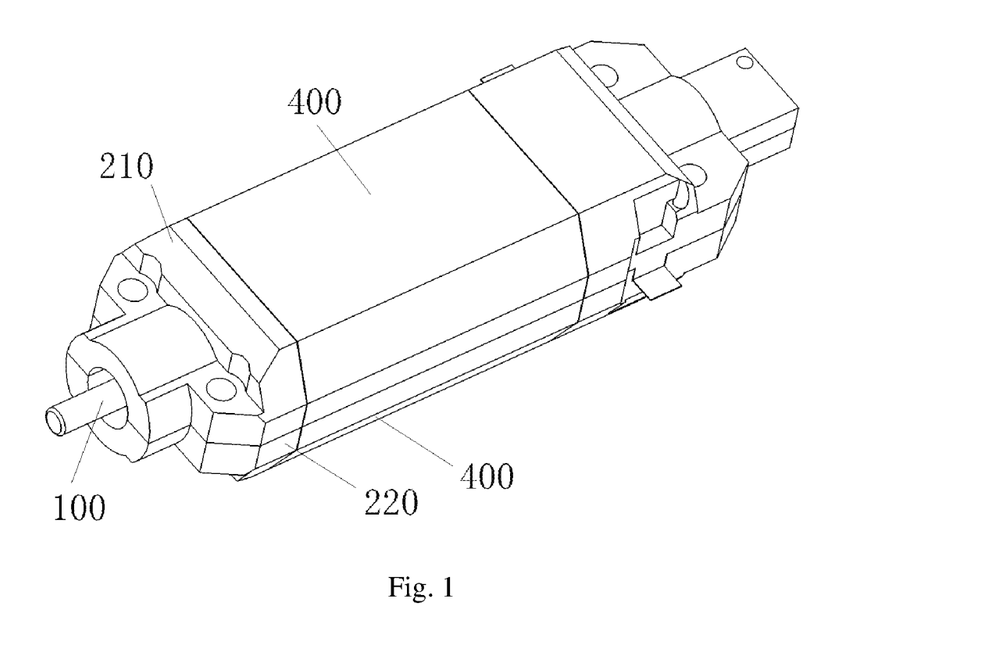
FIG. 1 is a schematic diagram of the appearance of the permanent magnet brush micromotor shown in the first embodiment of the application.
Figure 2:
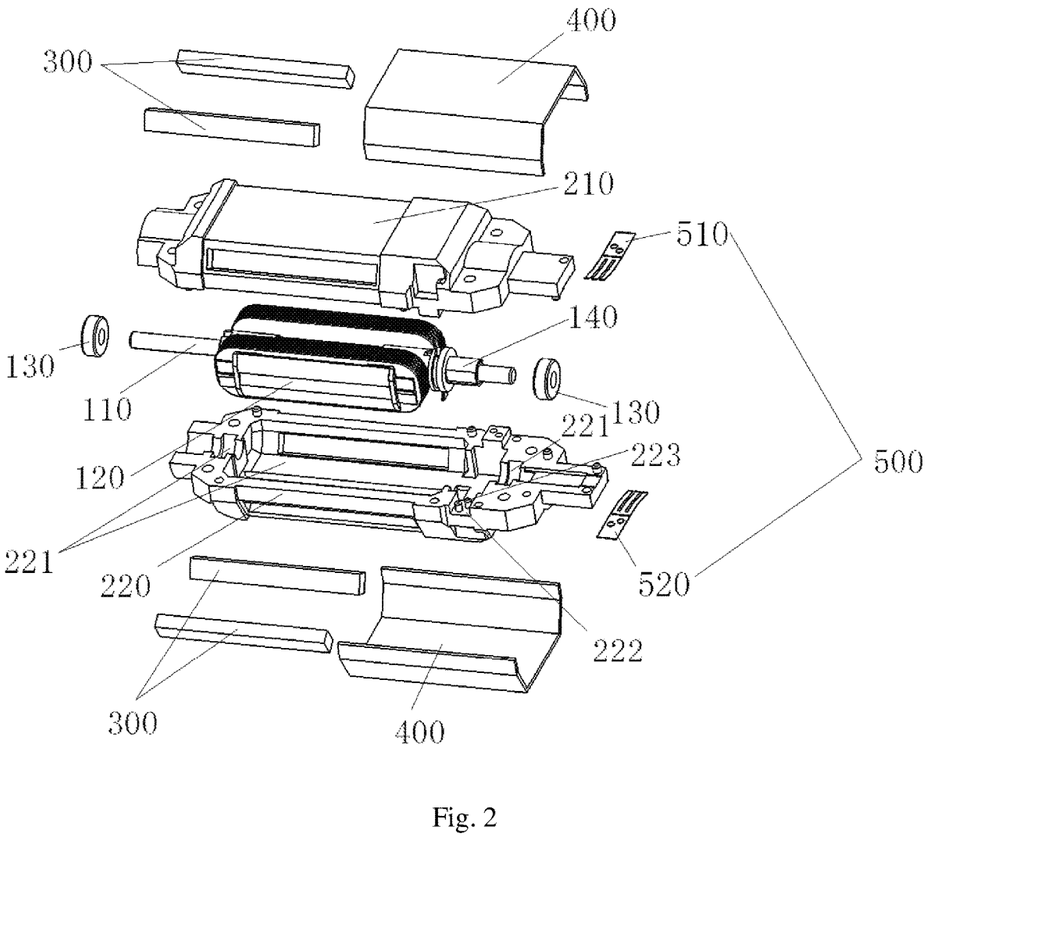
FIG. 2 is an exploded view of the permanent magnet brush micromotor shown in the first embodiment of the application.
Figure 4:
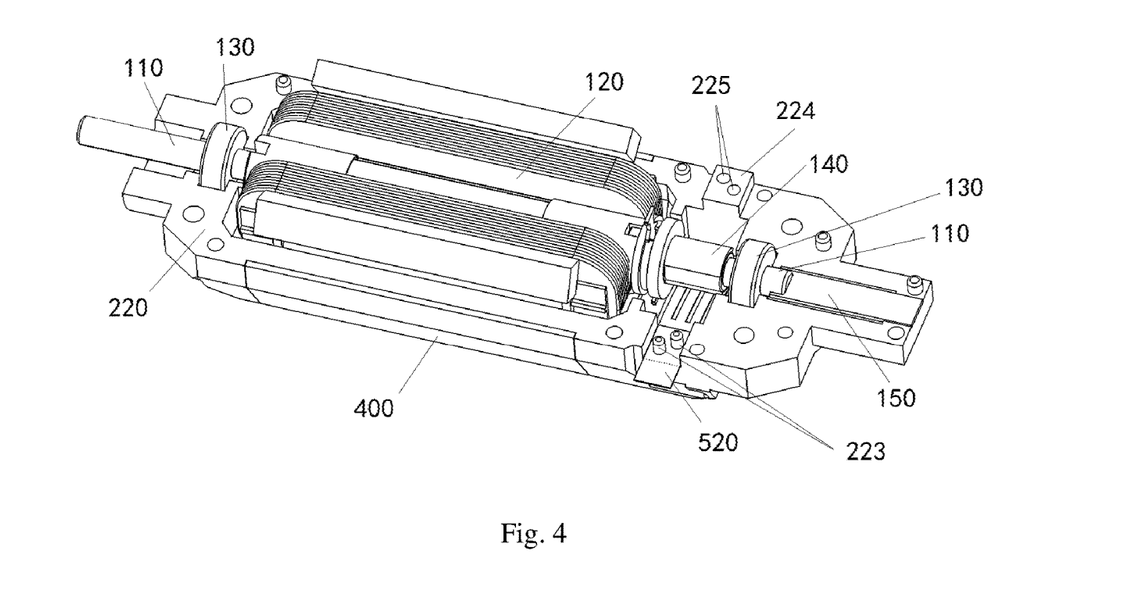
FIG. 4 is a schematic diagram of the mover assembly installed in the lower stator part shown in the first embodiment of the application.
Figure 5:
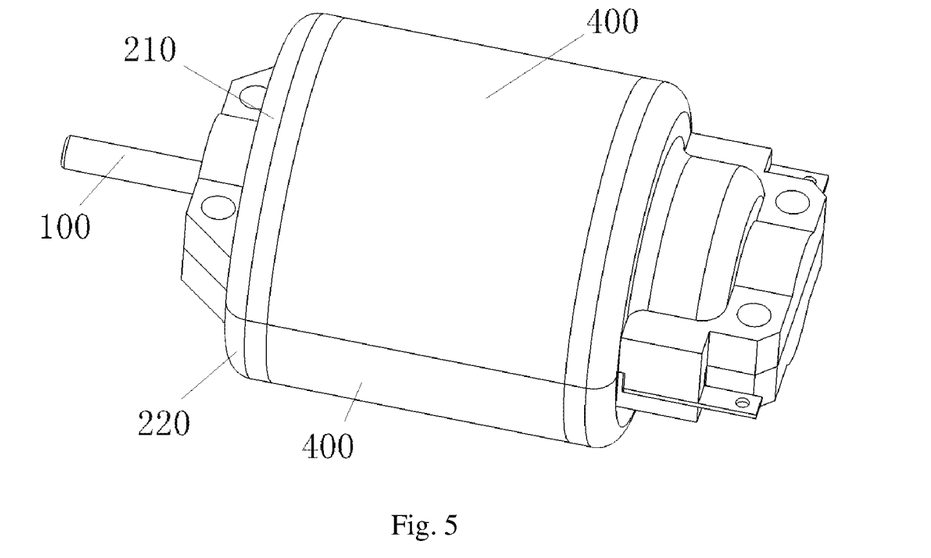
FIG. 5 is a schematic diagram of the appearance of the permanent magnet brush micromotor shown in the second embodiment of the application.
Figure 6:
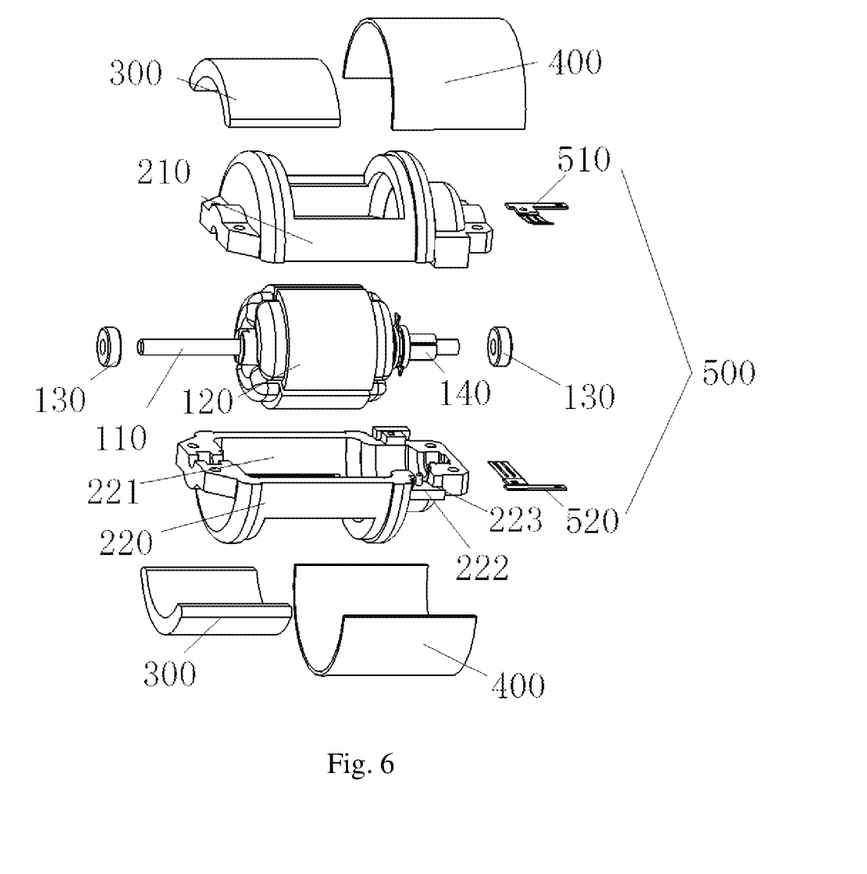
FIG. 6 is an exploded view of the permanent magnet brush micromotor shown in the second embodiment of the application.
Figure 7:
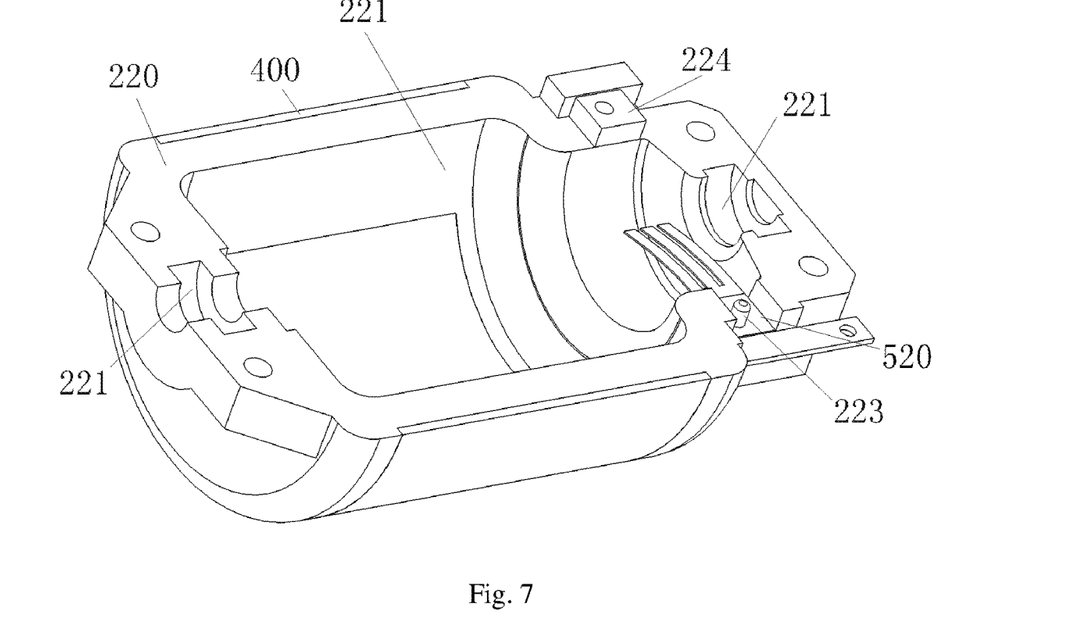
FIG. 7 is a structural schematic diagram of the lower stator part shown in the second embodiment of the application.
Figure 8:
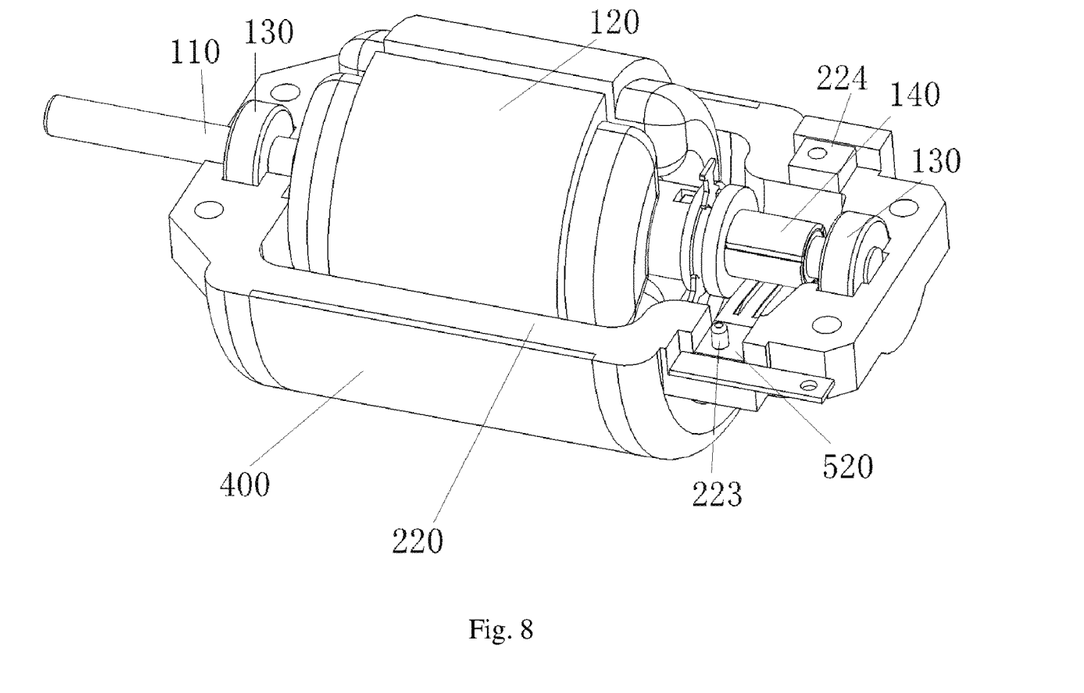
FIG. 8 is a schematic diagram of the mover assembly installed in the lower stator part shown in the second embodiment of the application.

Referring to FIGS. 2 and 4, the upper stator bracket 210 and lower stator bracket 220 take the plane passing through the centerline of the motor shaft 110 as their interface, while the permanent magnet 300, electric brush 500, brush mounting position and brush pressing position are symmetrically distributed around the centerline of the motor shaft 110. After the stator assembly is set, the bearing 130 on the rotor assembly is aligned with the bearing placing position, the rotor assembly is placed on the lower stator assembly, and then the upper stator bracket 210 is correspondingly installed on the lower stator bracket 220, and the corresponding bearing placing position will accordingly press and keep the bearing 130 in place.

Figure 3:
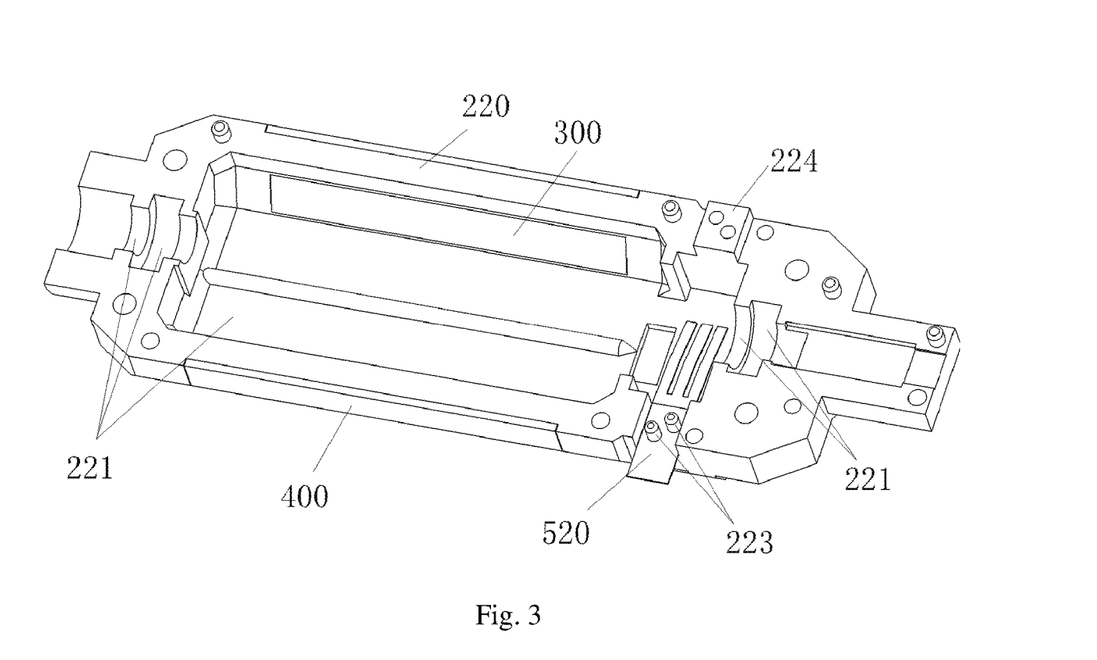
FIG. 3 is a structural schematic diagram of the lower stator part shown in the first embodiment of the application.

Further, referring to FIGS. 2-4, in one embodiment, the electric brush 500 includes an upper electric brush 510 and a lower electric brush 520. The upper electric brush 510 is installed on the upper stator bracket 210, and the lower electric brush 520 is installed on the lower stator bracket 220. The upper electric brush 510 and lower electric brush 520 respectively extend to the placing position of the commutator 140, so that when the upper stator bracket 210 and lower stator bracket 220 are fitted together, the upper electric brush 510 and lower electric brush 520 can respectively abut against the outer walls of both sides of the commutator 140. In this way, when installing the commutator 140 and the electric brush 500, there is no need to push the two electric brushes 500 aside. Since the lower electric brush 520 has been installed at the commutator 140 placing position of the lower stator bracket 220 in advance, the commutator 140 can be directly installed on the concave part 221 of the lower stator bracket 220, and accordingly, the commutator 140 presses on the lower electric brush 520. Then, the upper stator bracket 210 is correspondingly installed on the lower stator bracket 220, and the upper electric brush 510 will accordingly press on the other side of the commutator 140, and the electrical connection is completed.

Referring to FIGS. 2-4, in one embodiment, the upper stator bracket 210 and lower stator bracket 220 are respectively provided with a brush mounting position 222 and a brush pressing position 224. At least one positioning protrusion is arranged in the brush mounting position 222 (only the positioning protrusion 223 of the lower stator bracket 220 is shown in the figure). The upper electric brush 510 and lower electric brush 520 are provided with positioning holes corresponding to the positioning protrusions, and are respectively installed on the corresponding positioning protrusion. The positioning protrusion is used to position the electric brush 500, to avoid the electric brush 500 from being misplaced during installation. In the brush pressing position 224, a recess 225 corresponding to the positioning protrusion in the brush mounting position 222 is set. In an embodiment, referring to FIGS. 3 and 4, which only show the structure of positioning protrusion 223 on one side of the lower stator bracket 220, and the structure of positioning protrusion on one side of the upper stator bracket 210 is consistent with that of the lower stator bracket 220. There are more than two positioning protrusions 223, and the positioning protrusions 223 are asymmetrically arranged relative to the width centerline of the corresponding electric brush 500. The width centerline refers to a straight line passing through the midpoint of the width direction of the electric brush 500, and the width direction refers to the narrower side of the lower electric brush 520 as shown in FIG. 2 (the left-right direction as shown in FIG. 2). The asymmetrical arrangement of the electric brush 500 can avoid being installed upside down. If the lower electric brush 520 is rotated 180 degrees around its centerline, the lower electric brush 520 cannot be mounted on the positioning protrusion 223.

Obviously, in other embodiments, the number of the positioning protrusion can be one, and the positioning protrusion is offset with respect to a width centerline of the corresponding electric brush 500, which can also avoid being installed upside down.

In an embodiment, the brush mounting position 222 has a concave structure. The upper stator bracket 210 and lower stator bracket 220 are respectively provided with a brush pressing position 224 matching with the opposite brush mounting position 222, which is correspondingly a convex structure. Referring to FIGS. 2-4, only the convex structure 224 and the concave structure 222 on the lower stator bracket 220 are shown, and the convex structure and concave structure on the upper stator bracket 210 are the same as those of the lower stator bracket 220. The convex structure and concave structure are matched and press against the corresponding electric brush 500. In this way, the assembly is simple, and the electric brush 500 can be stably fixed.

The electric brush 500 is placed in the concave structure, and is according pressed by the convex structure of the other stator assembly during installation, so that the electric brush 500 does not need to be embedded or pushed aside, and the electric brush 500 does not deform, and the installation is simple.

In an embodiment, the upper stator bracket 210 and lower stator bracket 220 are respectively injection molded with plastic materials. The upper stator bracket 210 and lower stator bracket 220 made of plastic keep the bearing 130 in place, and because the plastic has certain elasticity, it will not cause deformation or shrinkage of the bearing 130. Thereby, accordingly reducing noise and prolonging service life. Meanwhile, the upper stator bracket 210 and lower stator bracket 220 are injection molded with plastic, which can ensure the consistency of installation.

Furthermore, in one embodiment, the upper stator bracket 210 and lower stator bracket 220 are respectively combined with the casing of the electrical appliance to which the motor is applied, and are integrated with the casing of the electrical appliance, which can reduce the installation steps of the motor in the electrical appliance, improve the assembly efficiency and reduce the cost.

Further, in one embodiment, the number of permanent magnets 300 is even, wherein half of the permanent magnets 300 are arranged on the upper stator bracket 210 and the other half of the permanent magnets 300 are arranged on the lower stator bracket 220. Referring to FIG. 2, there are four permanent magnets 300, which are grouped in pairs, one pair of the permanent magnet 300 is installed on the upper stator bracket 210, and the other pair of the permanent magnet 300 is installed on the lower stator bracket 220. The four permanent magnets are symmetrically distributed on the upper stator bracket 210 and the lower stator bracket 220 around the centerline of the motor shaft, and the symmetrical permanent magnets have opposite magnetic polarities. The permanent magnet 300, upper stator bracket 210 and lower stator bracket 220 can be fixed by adhesion or tight fit.

Referring to FIG. 2, the magnetic conductor 400 includes an upper magnetic tile and a lower magnetic tile, the upper magnetic tile covers the outer sides of the upper stator bracket 210 and the corresponding permanent magnet 300, and the lower magnetic tile covers the outer sides of the lower stator bracket 220 and the corresponding permanent magnet 300, forming a closed magnetic conductive frame.

In this embodiment, the upper stator bracket 210, and the permanent magnet 300, magnetic conductor 400 and upper electric brush 510 mounted on the upper stator bracket 210 constitute an upper stator assembly. The lower stator bracket 220, and the permanent magnet 300, magnetic conductor 400 and lower electric brush 520 mounted on the lower stator bracket 220 constitute a lower stator assembly. The joint of the upper stator assembly and lower stator assembly, as well as the permanent magnet 300, electric brush 500 and magnetic conductor 400, are centrosymmetric around the centerline of the motor shaft 110.

In other structures, the permanent magnet 300 may be installed after the upper stator bracket 210 and lower stator bracket 220 are assembled, and it can be installed at the joint of the upper stator bracket 210 and lower stator bracket 220, so as to form a fixed structure.

Furthermore, in one embodiment, by arranging a plurality of permanent magnets 300 with different polarities, the motor can be a rotation motor or a swing motor.

When the permanent magnet brush micromotor is a swing motor, referring to FIG. 4, in one embodiment, an elastic sheet 150 is fixed on the motor shaft 110, and the other end of the elastic sheet 150 is fixed on the lower stator bracket 220 (or the upper stator bracket 210).

Referring to FIGS. 1-4, in this embodiment, the upper stator bracket 210 and the lower stator bracket 220 form a flattened casing with a roughly hexagonal cross section. There are four permanent magnets 300, which are distributed in the upper stator bracket 210 and lower stator bracket 220 with two above and two below.

Embodiment 2

The embodiment provides another permanent magnet brush micromotor.

Referring to FIGS. 5-8, similarly, the permanent magnet brush micromotor comprises a mover assembly 100, an upper stator bracket 210, a lower stator bracket 220, a permanent magnet 300, a magnetic conductor 400 and an electric brush 500.

The mover assembly 100 comprises a motor shaft 110, and a core winding 120, a bearing 130, a commutator 140 installed on the motor shaft 110. The core winding 120 includes an iron core and a winding. There are two bearings 130, which are respectively positioned on both sides of the core winding 120, and are installed on the motor shaft 110 in a sliding fit, for supporting the motor shaft 110 and the core winding 120. The commutator 140 is used to keep active connection with the electric brush 500 for transmitting electric energy. The commutator 140 is usually positioned at one end of the motor shaft 110 to facilitate contact with the electric brush 500.

The upper stator bracket 210, lower stator bracket 220, permanent magnet 300, magnetic conductor 400 and electric brush 500 constitute a stator assembly. The upper stator bracket 210 and lower stator bracket 220 are each provided with a concave part (only the concave part 221 of the lower stator bracket 220 is shown in the figure) matching with half of the motor shaft 110, core winding 120, bearing 130 and commutator 140. In other terms, the upper stator bracket 210 and lower stator bracket 220 are respectively provided with concave parts. The shape of the concave part is matched with half of the motor shaft 110, core winding 120, bearing 130 and commutator 140, and the matching can be completely the same shape, or it can be a structure or shape larger than half of the size of those components, so as to accommodate or fix those components. Finally, the concave parts of the upper stator bracket 210 and lower stator bracket 220 can form a complete mounting cavity for mounting the motor shaft 110, core winding 120, bearing 130 and commutator 140. The motor shaft 110, core winding 120, bearing 130 and commutator 140 are accommodated in the mounting cavity, wherein the bearing 130 is fixed in the mounting cavity. The mover assembly 100 is supported by the bearing 130, and the motor shaft 110, core winding 120 and commutator 140 can rotate under the action of magnetic field.

The differences between the permanent magnet brush micromotor shown in this embodiment and the first embodiment include:

The number of the positioning protrusion for the brush mounting position on the upper stator bracket 210 and the lower stator bracket 220 can be one (only the positioning protrusion 223 on the lower stator bracket 220 is shown in the figure). In addition, the positioning protrusion is offset with respect to a width centerline of the corresponding electric brush 500, so as to avoid being installed upside down, and the corresponding electric brush 500 has a positioning hole corresponding to the positioning protrusion.

Meanwhile, the upper stator bracket 210 and lower stator bracket 220 form a cylinder-like case. There are two permanent magnets 300, one is at the top and the other at the bottom, they are symmetrically distributed on the upper stator bracket 210 and the lower stator bracket 220, and the corresponding permanent magnets have opposite magnetic polarities.

Embodiment 3

Embodiment 3 provides an assembly method applied to the permanent magnet brush micromotor as shown in any one of the above embodiments 1 and 2.

The assembly method comprises the following steps:

First, complete the following operations in no particular order:

installing an iron core and commutator 140 on the motor shaft, then winding a coil wire on the iron core to obtain the core winding 120, and welding an outgoing line of the core winding 120 on the commutator, the two bearings 130 are in sliding fit with the motor shaft 110 to form the mover assembly 100;

installing the permanent magnet 300 and magnetic conductor 400 on upper stator bracket 210 and lower stator bracket 220 respectively, and then placing the electric brushes 500 on the brush mounting positions of the upper stator bracket and lower stator bracket respectively, so as to form the upper stator assembly and lower stator assembly.

Secondly, installing the mover assembly 100 into the concave part 221 of the lower stator bracket 220.

Specifically, the lower stator bracket 220 is fixedly placed, the bearing 130 on the rotor assembly is aligned with the bearing placing position on the lower stator bracket 220, and the motor shaft 110, core winding 120 and commutator 140 are correspondingly installed in the concave part 221.

Finally, the upper stator bracket 210 is correspondingly installed on the lower stator bracket 220, and the upper stator bracket 210 and the lower stator bracket 220 are assembled and fixed, so that the mover assembly 100 is positioned in a complete mounting cavity.

The above is a further detailed description of the present application combined with specific embodiments, and it shall not be considered that the specific implementation of the present application is limited to these descriptions. For those of ordinary skill in the art, several ordinary deductions or substitutions can also be made without departing from the concept of the present application.

What is claimed is:

1. A permanent magnet brush micromotor, comprising:
   a mover assembly, comprising a motor shaft, and a core winding, a commutator and a bearing installed on the motor shaft, wherein the number of the bearings is two, and the two bearings are respectively arranged on two sides of the core winding;
   a stator assembly, comprising an upper stator bracket, a lower stator bracket, and a permanent magnet, a magnetic conductor and an electric brush installed on the upper stator bracket and the lower stator bracket; the upper stator bracket and lower stator bracket are provided with a concave part matched with half of the motor shaft, core winding, bearing and commutator, also provided is a brush mounting position for mounting the electric brush; an interface between the upper stator bracket and lower stator bracket is a plane passing through centerline of the motor shaft, the concave parts of the upper stator bracket and lower stator bracket are matched to form a complete mounting cavity for mounting the motor shaft, core winding, bearing and commutator, and the mover assembly is installed in the mounting cavity;

the permanent magnet is installed on the upper stator bracket and lower stator bracket for generating a magnetic field;

the magnetic conductors are respectively installed on the upper stator bracket and lower stator bracket and symmetrically arranged to form a closed magnetic conduction frame for conducting the magnetic field;

the electric brush is mounted at the brush mounting position and contacts with the commutator of the mover assembly; and the upper stator bracket and lower stator bracket are arranged with an electric brush pressing position respectively, the electric brush pressing position is used for matching with the opposite brush mounting position and pressing the electric brush, the electric brush comprises an upper electric brush and a lower electric brush, the upper electric brush is installed on the brush mounting position of the upper stator bracket, and the lower electric brush is installed on the brush mounting position of the lower stator bracket, the upper electric brush and lower electric brush respectively extend to a placing position of the commutator, so that when the upper stator bracket and lower stator bracket are assembled, the upper electric brush and lower electric brush can respectively abut against outer walls of both sides of the commutator.

2. The permanent magnet brush micromotor of claim 1, wherein the brush mounting position is provided with at least one positioning protrusion, and the upper electric brush and lower electric brush is provided with a positioning hole corresponding to the positioning protrusion, the upper electric brush and lower electric brush are respectively installed on the corresponding positioning protrusion; the electric brush pressing position is provided with a recess corresponding to the positioning protrusion of the brush mounting position.

3. The permanent magnet brush micromotor of claim 2, wherein the number of the positioning protrusion is one, and the positioning protrusion is offset with respect to a width centerline of the corresponding electric brush; or the number of the positioning protrusions is more than two, and the positioning protrusions are asymmetrically arranged relative to the width centerline of the corresponding electric brush.

4. The permanent magnet brush micromotor of claim 2, wherein the brush mounting position is a concave structure, and the brush pressing position is a convex structure, and the convex structure and concave structure are matched and press the corresponding electric brush.

5. The permanent magnet brush micromotor of claim 4, wherein the permanent magnets, electric brushes, brush mounting positions and brush pressing positions are symmetrically distributed around the centerline of the motor shaft.

6. The permanent magnet brush micromotor of claim 5, wherein the upper stator bracket and lower stator bracket are respectively injection molded with injection molding materials.

7. The permanent magnet brush micromotor of claim 6, wherein the number of the permanent magnets is even, half of the permanent magnets are arranged on the upper stator bracket and another half of the permanent magnets are arranged on the lower stator bracket; the magnetic conductor comprises an upper magnetic tile and a lower magnetic tile, the upper magnetic tile covers the outer sides of the upper stator bracket and the corresponding permanent magnet, and the lower magnetic tile covers the outer sides of the lower stator bracket and the corresponding permanent magnet, and the upper magnetic tile and lower magnetic tile are butted to form a closed magnetic conduction frame.

8. The permanent magnet brush micromotor of claim 1, wherein the permanent magnet brush micromotor is a swing motor, an elastic sheet is fixed on the motor shaft, and another end of the elastic sheet is fixed on the upper stator bracket or lower stator bracket.

9. An assembly method of the permanent magnet brush micromotor of claim 1, comprising the following steps:

installing an iron core and commutator on the motor shaft, then winding a coil wire on the iron core to obtain the core winding, and welding an outgoing line of the core winding on the commutator, the two bearings are in sliding fit with the motor shaft to form the mover assembly;

installing the permanent magnet and magnetic conductor on the upper stator bracket and lower stator bracket respectively, and then placing the electric brushes on brush mounting positions of the upper stator bracket and lower stator bracket respectively, so as to form the upper stator assembly and lower stator assembly;

installing the mover assembly into the concave part of the lower stator assembly; and combining and fixing the upper stator assembly and lower stator assembly so that the mover assembly is positioned in the complete mounting cavity.

\* \* \* \* \*